United States Patent [19]

Tseng

[11] Patent Number: 5,788,020

[45] Date of Patent: Aug. 4, 1998

[54] DEVICE FOR MICRO-ADJUSTING BICYCLE BRAKE HOLDER

[75] Inventor: Shih-Ming Tseng, Changhua, Taiwan

[73] Assignee: Chang Star Corporation, Changua, Taiwan

[21] Appl. No.: 926,991

[22] Filed: Sep. 10, 1997

[51] Int. Cl.$^6$ ..................................... B62L 1/14
[52] U.S. Cl. ........................ 188/24.12; 188/24.22
[58] Field of Search ................ 188/24.11, 24.12, 188/24.19, 24.21

[56] References Cited

U.S. PATENT DOCUMENTS 5,117,948  6/1992  Yoshigai .......................... 188/24.12
5,152,377  10/1992  Yoshigai .......................... 188/24.12
5,562,185  10/1996  Cheu .............................. 188/24.12

Primary Examiner—Chris Schwartz
Attorney, Agent, or Firm—Beveridge, DeGrandi, Weilacher & Young LLP

[57] ABSTRACT

A micro-adjusting device of a bicycle brake holder is composed of a cap, an adjusting piece, an adjusting seat, an elastic body, a ferrule fastened with the bicycle brake holder, and an adjusting bolt. The adjusting seat is engaged with the cap via the adjusting piece. The elastic body has a horizontal end which is located in an arcuate recess of the adjusting seat, and a vertical end which is located in a notch of the adjusting seat. The microadjustment of the bicycle brake holder is attained by rotating the adjusting bolt to bring about a displacement of the adjusting piece so as to cause the horizontal end of the elastic body to displace in the arcuate recess of the adjusting seat.

1 Claim, 3 Drawing Sheets

DEVICE FOR MICRO-ADJUSTING BICYCLE BRAKE HOLDER

FIELD OF THE INVENTION

The present invention relates generally to a bicycle brake, and more particularly to a device for micro-adjusting a holder of the bicycle brake.

BACKGROUND OF THE INVENTION

As shown in FIG. 1, a prior art device for micro-adjusting a bicycle brake holder is composed of a threaded rod A1, which is fitted into a cap A2 and a spring A33 which is in turn fitted into a spring housing element A4. The device is further composed of a fastening shaft A5, a spring-moving piece A6, a pad A10, and a fastening screw A11 which is engaged with the threaded hole of the threaded rod A1 so as to fasten the device with the lower end of a bicycle brake holder A9. The spring A3 has one end A31 which is engaged with an engagement hole A61 of the spring moving piece A6. The spring A33 has another end A32 which is received in a round hole A21 of the cap A2. The bicycle brake holder A9 is provided with a threaded hole A91 for engaging a micro-adjusting rod AS which is fitted into a spring A7. The micro-adjusting rod A8 is intended to push a retaining projection A62 of the spring-moving piece A6 for actuating the spring A3 so as to adjust the bicycle brake holder.

Such a prior art device as described above is defective in design in that the spring moving piece A6 is concealed entirely by the spring housing element A4, and that the contact between the retaining projection A62 of the spring moving piece A6 and the micro-adjusting rod A8 can not be observed with the naked eye in light of the obstruction of the spring housing element A4. In addition, the prior art device can not be used easily in view of the fact the micro-adjusting rod A8 can not be easily manipulated, and that the micro-adjusting rod A8 is easily interfered with by a reaction force which is brought about at such time when the spring moving piece A6 is urged by the micro-adjusting rod A8 to press against one end A31 of the spring A3.

SUMMARY OF THE INVENTION

The primary objective of the present invention is to provide a device for micro-adjusting a bicycle brake holder, which is relatively simple in construction and is free from the drawbacks of the prior art device described above.

In keeping with the principle of the present invention, the foregoing objective of the present invention is attained by an improved device consisting of a cap, an adjusting piece, an adjusting seat, an elastic body, a copper ferrule, and an adjusting bolt. The adjusting seat is provided with an inner recess and an arcuate slot, whereas the adjusting piece is provided with a projection and a depression. The cap is provided with a protruded edge and is engaged with the adjusting seat via the adjusting piece. The elastic body has a horizontal end which is received in the arcuate slot of the adjusting seat, the depression of the adjusting piece and a through hole of the cap. The elastic body has a vertical end which is located by the adjusting seat. The adjusting bolt is engaged with the adjusting seat such that the adjusting piece is displaced by the adjusting bolt in motion, so as to bring about the displacement of the horizontal end of the elastic body to enable a bicyclist to apply the brake lever properly.

The foregoing objective, features, function, and advantages of the present invention will be more readily understood upon a thoughtful deliberation of the following detailed description of an embodiment of the present invention with reference to the accompanying drawings.

DETAILED DESCRIPTION OF THE EMBODIMENT

Figure 1:
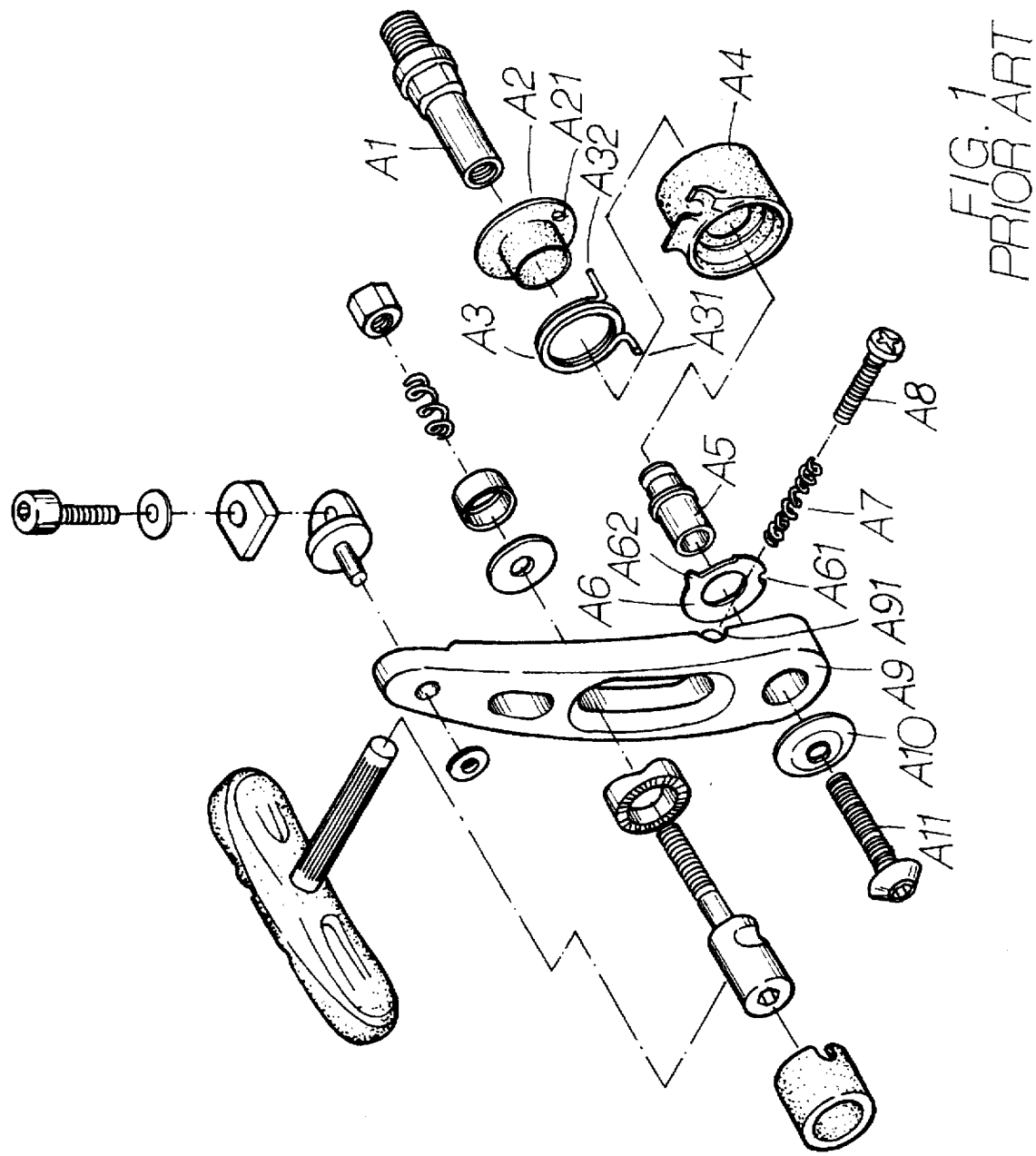
FIG. 1 shows an exploded view of the prior art.
Figure 2:
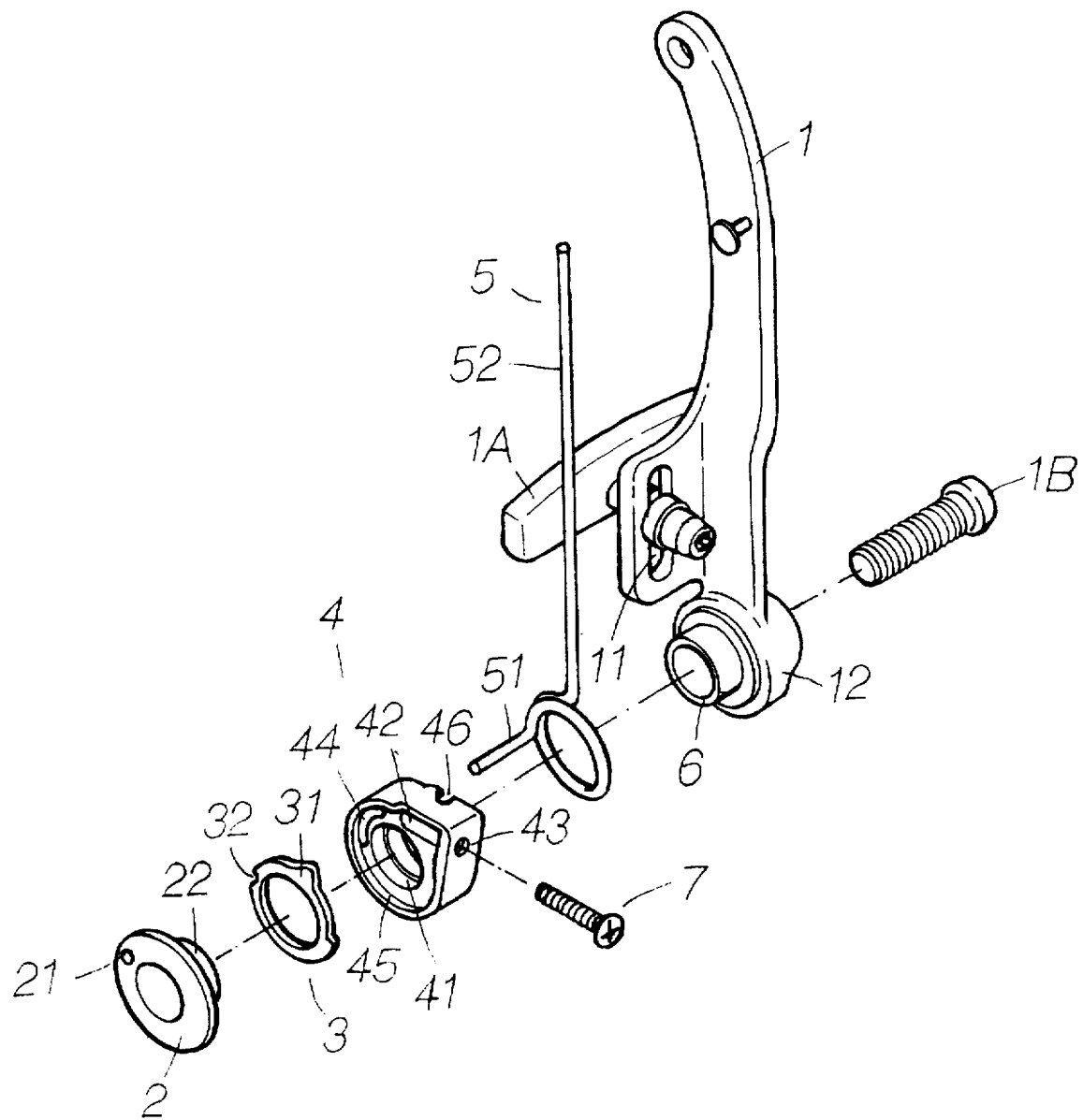
FIG. 2 shows an exploded view of the embodiment of the present invention.
Figure 5:
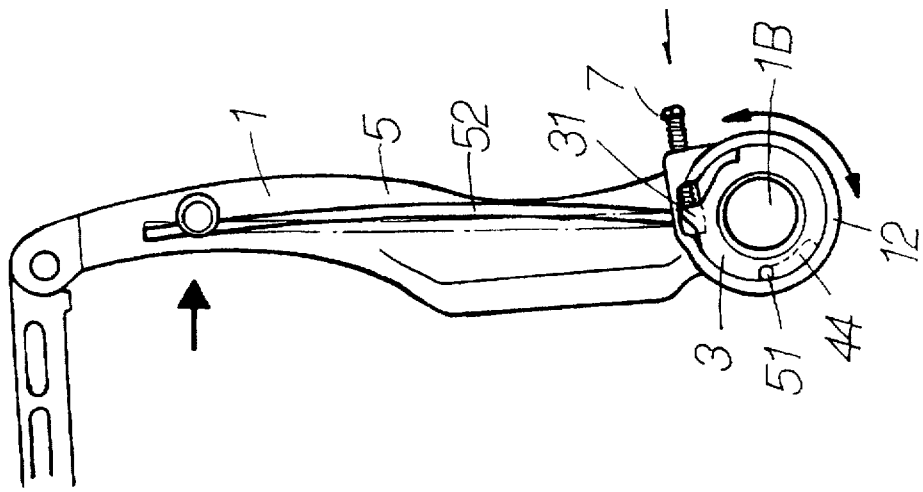
FIG. 5 shows a schematic view of the present invention at work.
Figure 4:
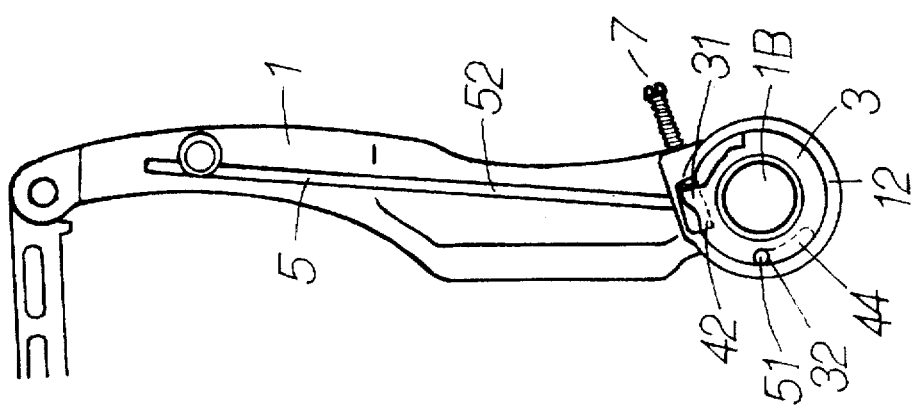
FIG. 4 shows a schematic view of the present invention in combination.
Figure 3:
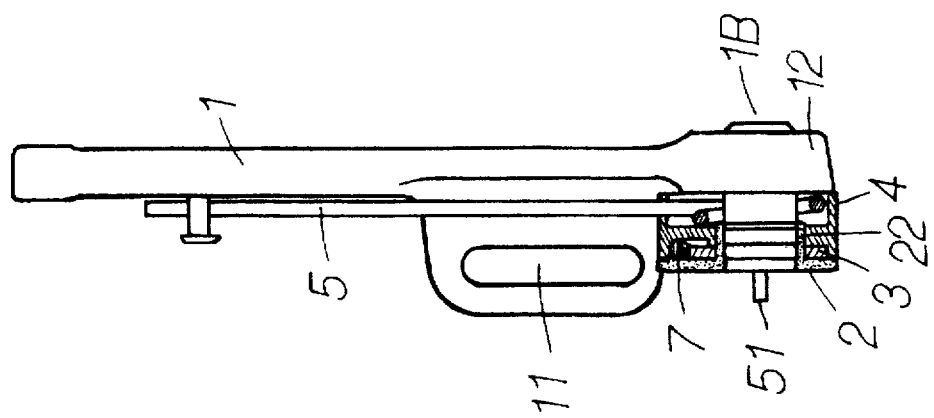
FIG. 3 shows a side view of the embodiment of the present invention.

As shown in FIGS. 2–5, a micro-adjusting device embodied in the present invention is intended to adjust a bicycle brake holder 1 and is fastened with a fastening portion 12 of the brake holder 1 in conjunction with a fastening bolt 1B. The brake holder 1 is provided with an oblong through hole 11 for holding a holder pad 1 A.

The device of the present invention is composed of a cap 2, an adjusting piece 3, an adjusting seat 4, an elastic body 5, a copper ferrule 6, and an adjusting bolt 7.

The cap 2 is provided in the periphery thereof with a fastening hole 21 and is provided at the canter thereof with a protuberance 22.

The adjusting piece 3 is of a hollow construction and is provided with a projection 31 and a depression 32.

The adjusting seat 4 is provided with an inner recess 42, a center hole 41, a threaded hole 43 in communication with the inner recess 42, an arcuate recess 44, a lip portion 45, and a notch 46.

The elastic body 5 has a horizontal leg 51 which is located in the arcuate recess 44 of the adjusting seat 4. The elastic body 5 further has a vertical leg 52 which is located in the notch 46 of the adjusting seat 4.

The copper ferrule 6 is fastened with the fastening portion 12 of the brake holder 1 and is engaged with the center hole 41 of the adjusting seat 4.

The adjusting bolt 7 is engaged with the threaded hole 43 of the adjusting seat 4 such that the adjusting bolt 7 can be rotated to cause the displacement of the adjusting piece 3, thereby resulting in the displacement of the horizontal leg 51 of the elastic body 5 in the arcuate recess 44 of the adjusting seat 4. As a result, the microadjustment of the brake holder 1 is attained.

The embodiment of the present invention described above is to be deemed as being merely illustrative and not restrictive. Accordingly, the present invention may be embodied in other specific forms without deviating from the spirit thereof. The present invention is therefore to be limited only by the scope of the following appended claim.

What is claimed is:

1. A device for micro-adjusting a bicycle brake holder, said device comprising:

a cap provided in a periphery thereof with a fastening hole and at a center thereof with a protuberance;

an adjusting piece of a hollow construction and provided with a projection and a depression;

an adjusting seat provided with a center hole, an inner recess, a threaded hole in communication with said inner recess, an arcuate recess, a lip portion, and a notch;

an elastic body having a horizontal leg 51 located in said arcuate recess of said adjusting seat, said elastic body further having a vertical leg located in said notch of said adjusting seat;

a ferrule fastened with a fastening portion of a bicycle brake holder and engaged with said center hole of said adjusting seat; and an adjusting bolt engaged with said threaded hole of said adjusting seat such that said adjusting bolt can be rotated to bring about a displacement of said adjusting piece, thereby resulting in a displacement of said adjusting piece, thereby resulting in a displacement of said horizontal leg of said elastic body in said arcuate recess of said adjusting seat.

* * * * *